United States Patent [19]

Sawada et al.

[11] Patent Number: 5,506,387
[45] Date of Patent: Apr. 9, 1996

[54] METHOD AND APPARATUS FOR SPLICING METAL WEBS

[75] Inventors: Hirokazu Sawada; Tsutomu Kakei; Masaya Matsuki, all of Shizuoka, Japan

[73] Assignee: Fuji Photo Film Co., Ltd., Kanagawa, Japan

[21] Appl. No.: 395,290

[22] Filed: Feb. 27, 1995

Related U.S. Application Data

[63] Continuation of Ser. No. 132,215, Oct. 6, 1993, abandoned, which is a continuation of Ser. No. 892,737, Jun. 1, 1992, abandoned, which is a continuation of Ser. No. 771,854, Oct. 7, 1991, abandoned, which is a continuation of Ser. No. 470,657, Jan. 26, 1990, abandoned.

[30] Foreign Application Priority Data

| Jan. 30, 1989 | [JP] | Japan | 1-20534 |
| Feb. 10, 1989 | [JP] | Japan | 1-32292 |
| Feb. 13, 1989 | [JP] | Japan | 1-33313 |

[51] Int. Cl.$^6$ ................................ B23K 9/02
[52] U.S. Cl. ............... 219/137 PS; 219/75; 219/125.1
[58] Field of Search .................. 219/75, 137 R, 219/145.21, 125.1, 137 PS

[56] References Cited

U.S. PATENT DOCUMENTS

| 2,274,631 | 2/1942 | Meredith | 219/75 |
| 2,649,528 | 8/1953 | Koenig et al. | 219/137 R |
| 3,231,332 | 1/1966 | Jones et al. | 219/145.21 |
| 3,715,561 | 2/1973 | Hammarlind | 219/75 |
| 4,471,208 | 9/1984 | Edmonds | 219/75 |

FOREIGN PATENT DOCUMENTS

| 203328 | 5/1959 | Germany . |
| 1196807 | 7/1965 | Germany . |
| 1465030 | 1/1969 | Germany . |
| 3824698 | 2/1989 | Germany . |
| 1141112 | 1/1969 | United Kingdom . |

OTHER PUBLICATIONS

T. Lyman, ed., Metals Handbook, 8th edition, vol. 6, Welding and Brazing, 1971, pp. 113 and 118–120.

*Primary Examiner*—Clifford C. Shaw
*Attorney, Agent, or Firm*—Sughrue, Mion, Zinn, Macpeak & Seas; Richard C. Turner; Marc Kaufman

[57] ABSTRACT

Method and apparatus for splicing together the ends of metal webs by TIG welding. In the method and apparatus, since the tapered end portion of an electrode disposed at the leading end of a welding torch for use in TIG welding is formed in a semi-spherical shape or in a circular flat surface, arc can remain stable even if the length of the arc in the TIG welding is changed suddenly at the welding starting or terminating end portion of the weldedly spliced portion of the metal webs.

5 Claims, 7 Drawing Sheets

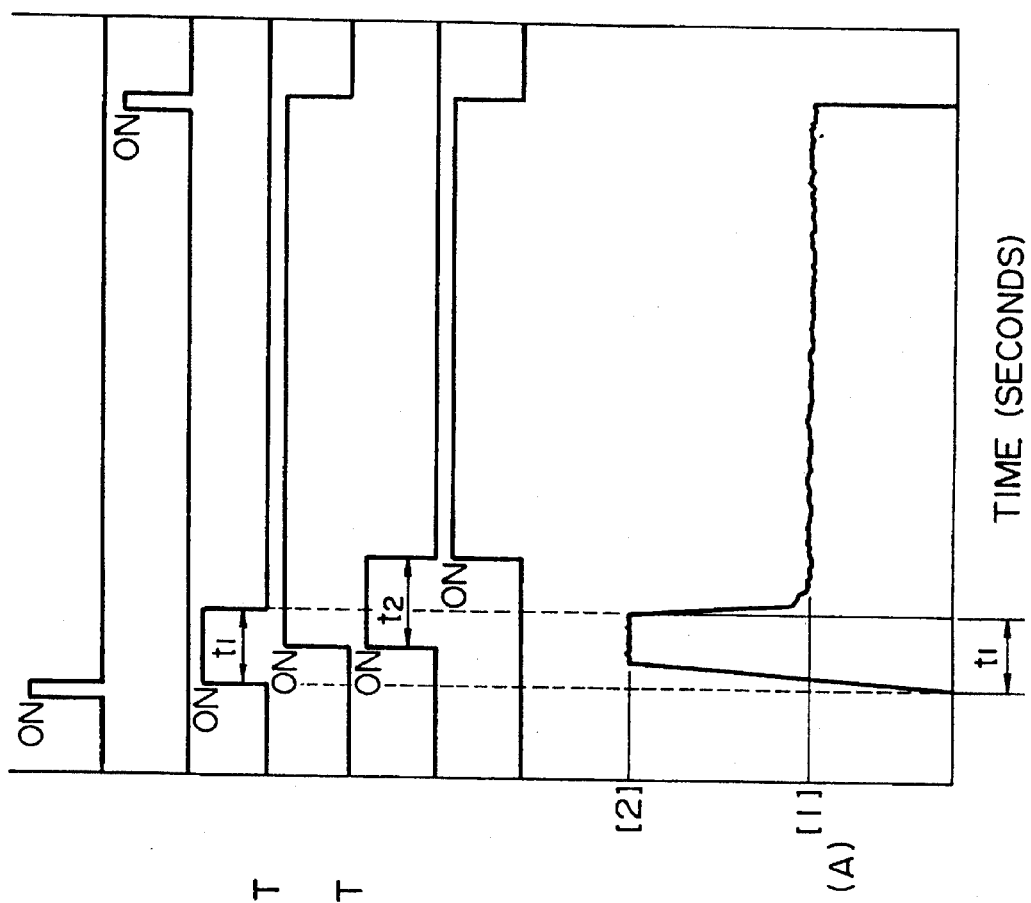

METHOD AND APPARATUS FOR SPLICING METAL WEBS

This is a continuation of application Ser. No. 08/132,215 filed Oct. 6, 1993, now abandoned which is a continuation of application Ser. No. 007/892,737 filed Jun. 1, 1992, now abandoned which is in turn a continuation of application Ser. No. 07/771,854 filed Oct. 7, 1991, now abandoned, which is in turn a continuation of application Ser. No. 07/470,657 filed Jan. 26, 1990, now abandoned.

BACKGROUND OF THE INVENTION

1. Field of the Invention

The present invention relates to method and apparatus for splicing together metal webs and, in particular, to such method and apparatus in which the ends of flexible metal webs are spliced together.

2. Description of the Related Art

A conventional metal webs splicing method includes a lap splicing method in which metal webs are in part lapped on each other before they are spliced together and a butt splicing method in which the metal webs are butted against each other before they are spliced together. In FIG. 6(a), there is shown a perspective view of a conventional lap splicing method. As shown in FIG. 6(a), the ends of two metal webs 70 and 72 are lapped on each other and their engagement surfaces 73 are bonded together by a double-side adhesive tape or are fused together by use of ultrasonic waves (FIGS. 4 and 6 of Publication of Laid-Open Japanese Patent Application (Tokkai), No. 59-24526).

Also, in FIG. 6(b), there is shown a perspective view of a conventional metal webs butt splicing method. As shown in FIG. 6(b), the ends of the metal webs 70, 72 are butted against each other and their butt splice portions 75 are spliced together by use of a single-side adhesive tapes 76, 76 (FIG. 2 of Publication of Laid-Open Japanese Patent Application (Tokkai), No. 59-24526).

However, in the conventional metal webs splicing method as shown in FIG. 6(a), there exists a difference in level between the metal webs, that is, between the spliced portions thereof, and, therefore, the spliced metal webs cannot be brought into smooth contact with pass rollers and the like. Also, in a coating step of a photo-sensitive layer in manufacturing a lithographic (planographic) printing plate, when the spliced portions of the metal webs are passed through a coating device, the coating device must be shunted or moved aside in order to prevent against damage. Further, even when the coating device need not be moved aside, the engagement or spliced surfaces 73 have a harmful effect on the state of the coated layer, resulting in a poor quality.

In addition to the above-mentioned disadvantage, in many cases, the spliced surfaces 73 cannot be bonded entirely, with the result that the spliced surface 73 may be turned up while the spliced metal webs are being delivered. Moreover, if there is a process in which the surface of the metal web is treated by use of a treating solution, when the metal web is passing through the treating solution, alien substances such as the treating solution and the like may enter clearances in the spliced surface 73, which gives rise to the generation of a poor quality in following steps.

On the other hand, in the conventional butt splicing method as shown in FIG. 6(b), because the metal webs are spliced together by use of the single-side adhesive tapes 76, 76, the spliced portion produces a level difference in thickness due to the tapes 76, 76. This level difference results in the same disadvantage as in the lap splicing method shown in FIG. 6(a). In such butt splicing method, especially, while the spliced metal webs are being delivered in processes by the pass rollers and the like, the portions of the tapes 76, 76 existing in the butted portions of the metal webs can be shaved off by the edges of the metal webs butted portions to decrease the strength of the tapes 76, 76, so that the adhesive tapes 76, 76, that is, the spliced metal webs may be disadvantageously easy to break. Further, such spliced metal webs are subject to bending stresses while passing through the pass rollers, the spliced portions of the metal webs are easy to break due to such bending stresses. Such breakage may occur outstandingly especially in case of a thin metal web having a thickness of 0.1 mm to 0.2 mm or so and when the two metal webs to be spliced differ greatly in the thicknesses thereof.

In order to solve the above-mentioned problems, there have been disclosed a splicing method in which metal webs are spliced together by welding, while the weldedly spliced portion thereof is rolled to thereby eliminate a level difference between the metal webs, and a splicing method in which an operation to prevent concentration of stresses is performed on a heat affected zone that is produced in the spliced portion due to welding.

In the above-mentioned methods, in general, automatic arc welding is applied and, as shown in FIG. 7, in such arc welding, in most cases, arc is generated while an electrode 86 is maintained in non-contact with metal webs 10, 22. In other words, a mixture gas of He, Ar and the like is flowed into a welding torch 84 and, while the mixture gas is blown down as a shield gas from an opening 85A of a torch cup 85, arc is generated by an arc voltage between the electrode 86 and a back bar 87. Next, the welding torch 84 is moved along the portions to be spliced of the metal webs 10, 22 (in a direction of an arrow A in FIG. 7) to weld and splice the metal webs 10, 22 together. In this case, since the arc is generated while the electrode 86 is maintained in non-contact with the metal webs 10, 22, the leading end of the electrode 86, as shown in FIG. 7, is made in the shape of a sharp edge in order to facilitate the generation of the arc.

However, if the leading end of the electrode 86 is constructed in the form of a sharp edge, as shown in FIG. 7, when the electrode 86 moving in the direction of the arrow A arrives at the metal web, the length of the arc is suddenly decreased from L to L' so that the arc becomes unstable. For this reason, the metal webs cannot be fused sufficiently and thus sufficient both sides welding, that is, welding of not only the front surface but also the back surface of the metal webs cannot be achieved. In other words, at the beginning of the welding, poor fusion may be produced in the weldedly spliced portion and, on the other hand, just after the start of the welding, excessive arc heat may be applied to the metal web, with the result that the metal web may be melted away at the heated portion thereof to produce a perforation there, which is a problem to be solved.

Also, at the end of the welding, the arc length is suddenly increased from L' to L to thereby make the arc unstable, resulting in poor fusion as well as production of perforations.

Further, since there is a time lag of 0.1 sec. to several sec. from the generation of the arc to the time when the arc is changed to a stable arc, if the metal webs 10, 22 are welded and spliced together immediately after the generation of the arc, then the welded splicing of the metal webs is achieved with an arc current which is greater or smaller than a preset value. That is, in case of a thin metal web, just after the generation of the arc, the arc is generated with an arc current greater than the preset value, so that the welding starting portion of the metal web may be melted away. On the other hand, in case of a thick metal web, since the arc is generated with an arc current smaller than the preset value, there can be produced poor fusion or an unfused portion in the welding starting portion of the metal web.

In addition, just after the generation of the arc, the temperature of the electrode 86 is not stable the receiving and transmission of electrons are likely to be unstable, with the result that the arc becomes unstable. Especially, in welding and splicing metal webs together which are formed as thin metal plates, such unstable arc may give rise to uneven beads in the welding starting portion so that poor fusion, perforation, poor appearance (lack of luster) or the like may occur.

The above-mentioned melting-away, poor fusion, unfusion, perforation and the like not only have greatly ill effects on the strength of the weldedly spliced portion, but also, if the following steps include a surface treatment step and/or a coating step, give rise to dirty rollers due to penetration of medical solutions or coating liquid into the back sides of the rollers during the steps and give rise to damaged rollers by the spliced end portions.

SUMMARY OF THE INVENTION

The present invention aims at eliminating the drawbacks found in the above-mentioned prior art splicing methods.

Accordingly, it is an object of the invention to provide a metal webs splicing method which prevents occurrence of poor fusion or perforations at the welding starting and/or terminating end(s) of the weldedly spliced portion of metal webs spliced.

Also, it is another object of the invention to provide a metal webs splicing method which prevents occurrence of melting-away, poor fusion, unfused states, perforations, poor appearance or the like in the weldedly spliced portion of metal webs spliced.

In order to achieve the above objects, according to the invention there is provided a metal webs splicing method which splices together metal webs at the ends thereof by use of TIG welding, in which arc is generated in such a manner that the arc is at a distance from the metal webs to form the tapering end portion of an electrode in a hemispherical shape by preliminary welding, the ends of the metal webs are welded and spliced together by use of the spherically-shaped, tapering end portion of the electrode, and the weldedly spliced portions of the metal webs are then rolled.

According to the invention, arc is generated at a distance from the metal webs to thereby be able to form the tapering end portion of the electrode into a hemispherical shape by preliminary welding, and the arc is generated from the hemispherical surface of the thus formed hemispherically shaped, tapering electrode end portion, so that the arc will never be unstable even if the length of the arc is suddenly changed at the welding starting or terminating end of the metal webs spliced portion. Therefore, sufficient both sides welding can be performed on the weldedly spliced portion of the metal webs to thereby be able to prevent occurrence of poor fusion, perforations or the like in the weldedly spliced portion of the metal webs.

Also, in order to achieve the above objects, according to the invention, there is provided a metal webs splicing method which uses a welding device to TIG weld and splice together the ends of metal webs and also uses a rolling device to roll the weldedly spliced portion of the metal webs, wherein a tapering electrode is disposed at the leading end of a welding torch of the welding device and at the leading end of the electrode there is formed an arc generating surface comprising a circular flat surface having a diameter of 0.3 mm or more.

According to the invention, the flat surface having diameter of 0.3 mm or more is formed in the electrode in the welding torch and arc is generated from the flat surface, so that the arc will never be unstable even if the length of the arc is suddenly changed at the welding starting or terminating end of the spliced portion. Therefore, sufficient both sides welding can be performed on the weldedly spliced portion of the metal webs to thereby be able to prevent occurrence of poor fusion, perforations or the like in the weldedly spliced portion of the metal webs.

Further, in order to attain the above objects, according to the invention, there is provided a metal webs splicing method which splices together the ends of metal webs by use of TIG welding, wherein arc is generated at a distance from the metal webs, the metal webs ends are welded and spliced together after the lapse of 0.6 sec. or more since the generation of the arc, and the weldedly spliced portion of the metal webs is then rolled.

According to the invention, the arc that is used to weld and splice together the metal webs is generated at a distance from the metal webs and, after the lapse of 0.6 sec. since the generation of the arc, the ends of the metal webs are welded and splice together. Therefore, the welding can be performed after the arc settles down to a set value and also the welding can be performed after the temperature of the electrode is stabilized.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIGS. 5(a)–5(g) are a flow sheet of operation of a welding device used in a metal webs splicing method according to the invention, further illustrating a relationship between arc current and time;

DETAILED DESCRIPTION OF THE INVENTION

Detailed description will hereunder be given of the preferred embodiments of method and apparatus for splicing together metal webs according to the present invention with reference to the accompanying drawings.

Figure 1:
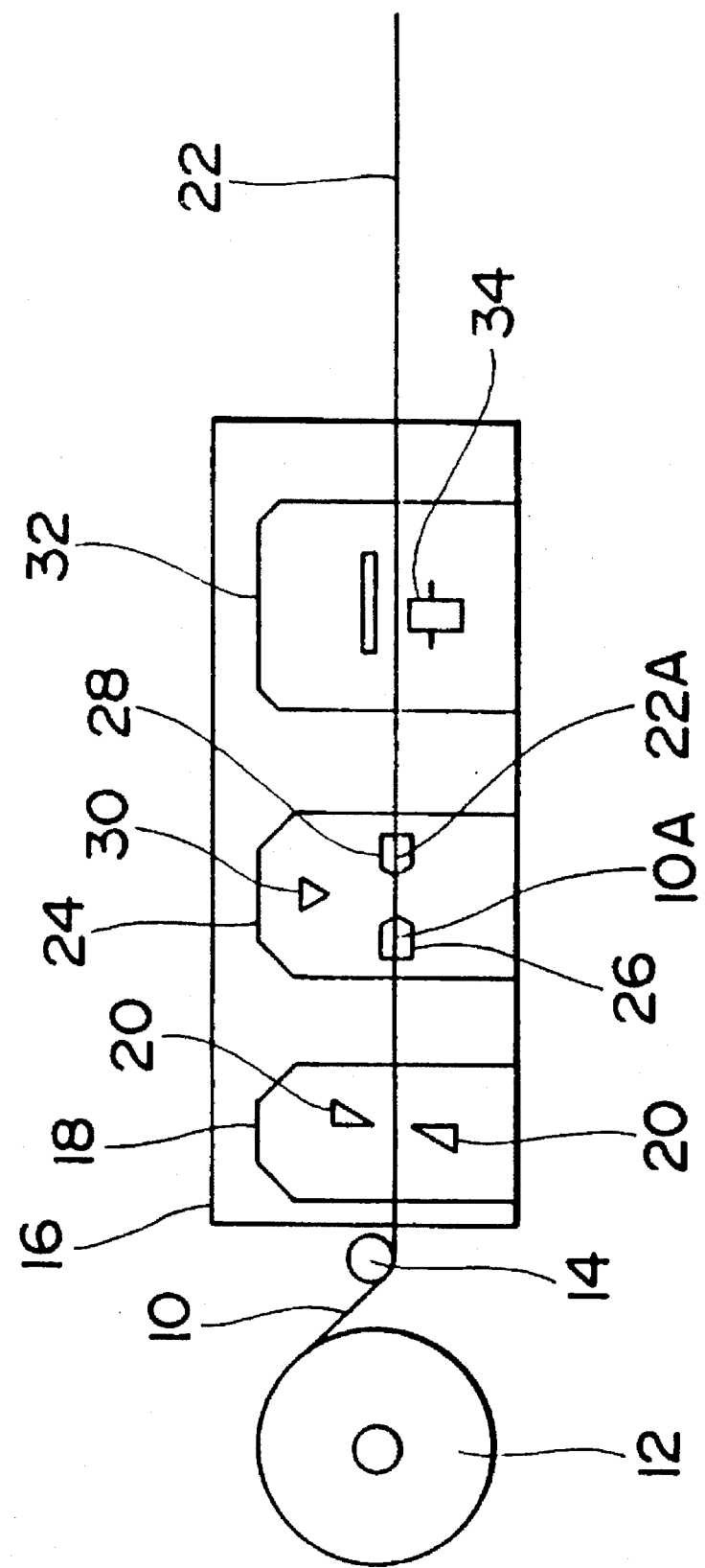
FIG. 1 is an explanatory view of a metal webs splicing method according to the invention.

Referring first to FIG. 1, there is shown an explanatory view to illustrate a metal webs splicing method according to the invention. As shown in FIG. 1, a metal web 10 of Al alloy is wound back from a roll 12, is then transferred to a pass roller 14, and is then delivered to a splicing apparatus 16. The splicing apparatus 16 includes a precutting device 18 which comprises two cutters 20, 20. The leading end 10A of the metal web 10 is cut by the precutting device 18 so that it can be accurately butted against or slightly lapped on the trailing end 22A of a metal web 22 which is also formed of Al alloy.

Figure 2:
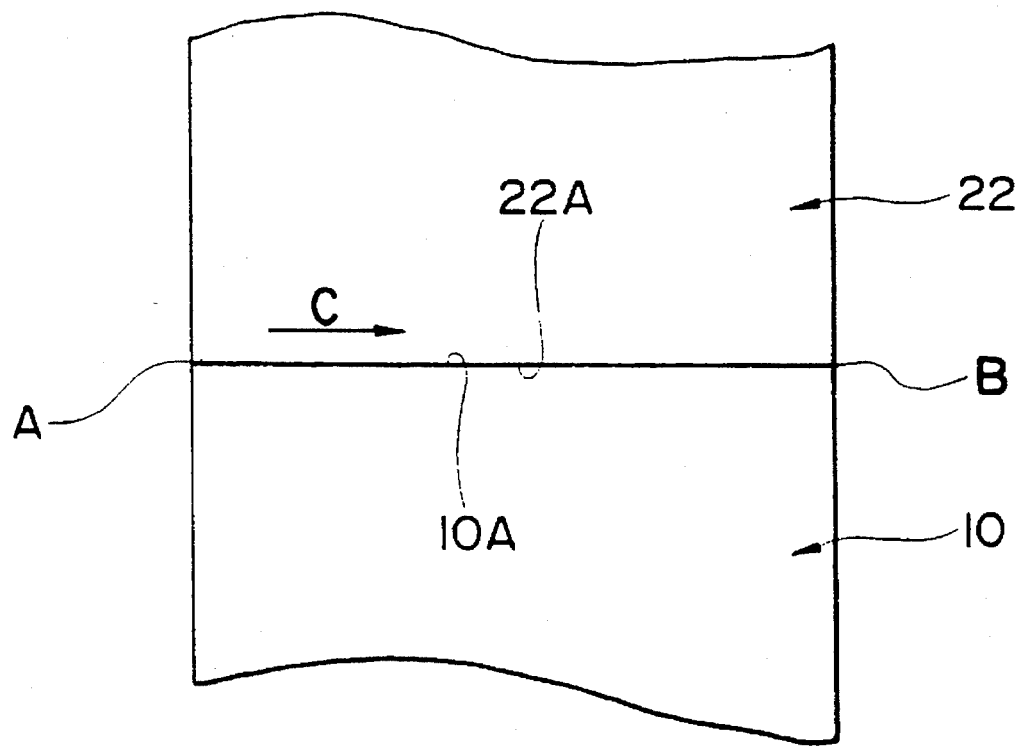
FIG. 2 is a plan view to show a state in which metal webs are welded by a metal webs splicing method according to the invention.

Downstream of the precutting device 18 there is disposed a welding device 24 which comprises two clamps 26, 28, and a welding torch 30. The clamp 26 is used to hold the leading end 10A of the metal web 10 and the clamp 28 is used to hold the trailing end 22A of the metal web 22. Therefore, the leading end 10A and trailing end 22A, as shown in FIG. 2, are butted against each other and the butted portion is then welded together by high-frequency pulse arc welding. That is, the welding torch 30 moves from A position to B position in the width direction of the metal web (in a direction of an arrow C) in the butted portion shown in FIG. 2 to weld and splice together the leading end 10A and the trailing end 22A of the metal webs.

In the present embodiment, the welding torch 30 moves at a speed of 6 m/min. along the butted portion of the metal webs and a welding current is set at such a level as to be able to supply heat to sufficiently fuse the leading end 10A and the trailing end 22A.

Figure 3:
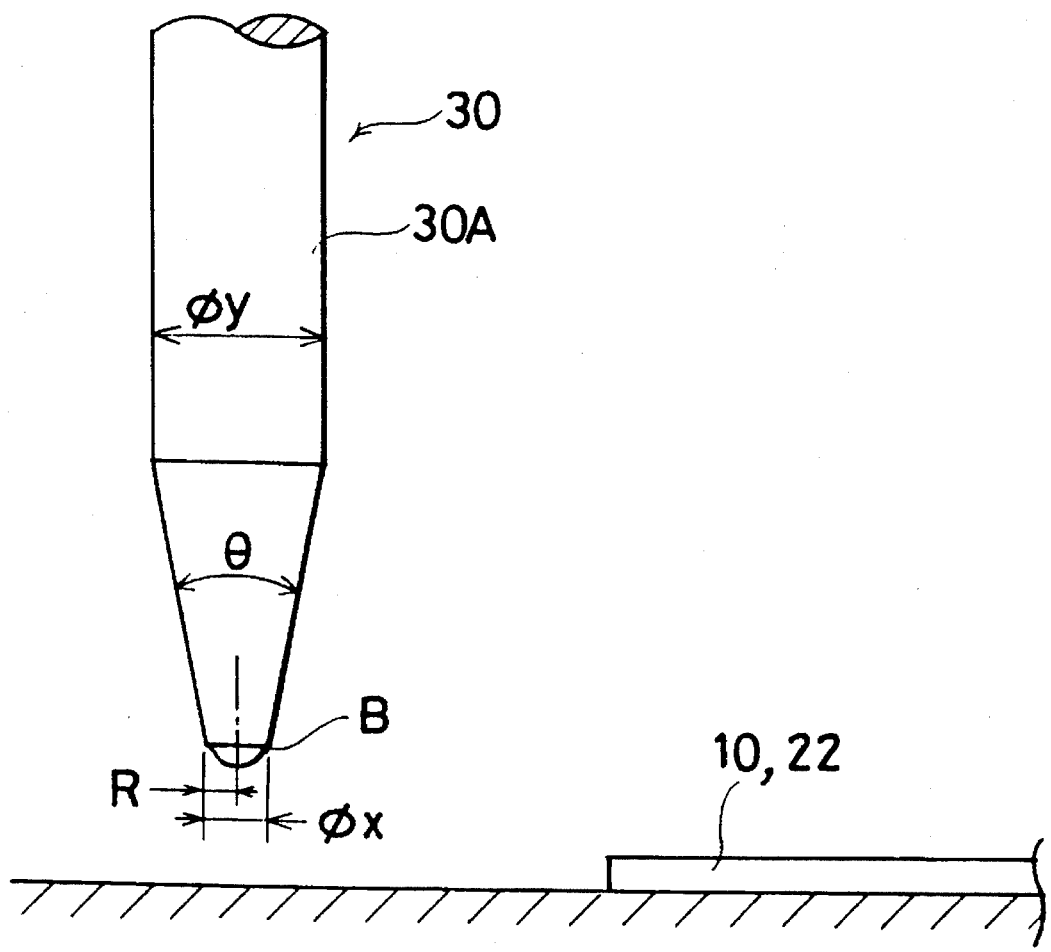
FIG. 3 is a side view of an electrode which is blank welded by a metal webs splicing method according to the invention.

In FIG. 3, there is shown a tungsten electrode 30A which is provided in the welding torch 30. The tungsten electrode 30A is generally formed in a substantially cylindrical body having a diameter of y, while the diameter thereof is gradually decreased from y to x, starting with A point thereof down to B point in the lower endface thereof. In the drawings, reference character θ designates an angle of the leading end of the electrode and the leading end angle may be 60 degrees or less, preferably, in the range of 45~20 degrees. The lower endface B of the electrode 30A is formed in a hemispherical surface shape. The hemispherical surface has a radius R which may be 0.15 m or more, preferably, 0.3 mm or more. That is, when splicing together the metal webs by welding, the tungsten electrode 30A having a sharp-edged leading end is disposed apart from the metal webs and the tungsten electrode 30A is operated to generate arc for preliminary welding. For this reason, the leading end of the tungsten electrode 30A is worn out into a hemispherical shape. Next, the tungsten electrode 30A is moved up above the metal webs 10, 22 to weld and splice together the metal webs. In this case, as shown in FIG. 3, when the tungsten electrode 30A reaches above the welding starting ends of the metal webs 10, 22, then the length of the arc is suddenly decreased from L to L' but, since the hemispherical surface B of the tungsten electrode 30A provides an arc generating surface, an arc generation boundary is broadened so that the arc is not likely to be unstable. Therefore, there is eliminated the possibility that poor fusion, perforations or the like may occur in the end portions of the weldedly spliced metal webs 10, 22. Also, when the tungsten electrode moves away from the welding terminating ends of the metal webs, the arc length is similarly increased suddenly from L' up to L but, likewise in the above-mentioned case, the arc is not likely to be unstable so that occurrences of poor fusion, perforations or the like can be avoided.

Now, downstream of the welding device 24 there is disposed a rolling device 32 including a reduction roller 34 which is used to roll the weldedly Spliced portion of the metal webs ends 10A, 22A. A level difference produced in the weldedly spliced portion can be pressed and constricted by such rolling treatment. This rolling treatment enhances the strength of splicing of the metal webs. The reason for this is that the tensile strength of the metal webs lowered due to the welding is recovered due to the work hardening of the metal webs by the rolling treatment and, at the same time, the spliced portion is worked into a shape which can prevent stress concentration.

In the above-mentioned embodiment, the metal web 10 is butted against the metal web 22 but this is not always limitative. For example, they are slightly lapped on each other. However, when the metal webs 10 and 22 are slightly lapped on each other and are then spliced together, a rolling treatment is especially required.

Next, description will be given below of the results obtained when the spliced portion achieved by a metal webs splicing method according to the present invention (that is, by use of an electrode having a leading end which is formed in a hemispherical shape by preliminary welding) is compared with the spliced portion achieved by use of an electrode having a leading end which is formed in a sharp edge shape by grinding.

Test samples No. 1 to No. 20 were respectively obtained in such a manner that metal webs of Al alloy each having a thickness of 0.10 mm and a width of 915 mm were lapped by 1 mm on each other and were then welded and spliced together at a speed of 6 m/min., and the resultant spliced portions were rolled under the same condition.

Test samples No. 1 to No. 10 are metal webs which were spliced by use of an electrode obtained by grinding a tungsten electrode having a diameter of 2.4 mm φ into a sharp edged body having a leading end angle of 30° and then by preliminary welding the same one time with a welding current of 16A.

Also, test samples No. 11 to No. 20 are metal webs which were spliced by use of an electrode obtained by grinding a tungsten electrode having a diameter of 2.4 mm φ into a sharp edged body having leading end angle of 30°, with no preliminary welding.

Now, the appearances of these samples No. 1 to No. 20 before rolled were compared with one another and evaluated. The evaluations were made based on the rates of generation of sooting, poor fusion and perforations in the two ranges of the respective samples: one range is the welding starting end to 10 mm therefrom; and the other from the welding terminating end to 10 mm preceding thereto. The evaluation results are shown in Table 1. In this table, for example, 4/10 represents that, in 4 of 10 samples, sooting, poor fusion, perforations or the like are found.

TABLE 1

| Sample No. | Rate of Generation of Sooting (Oxidized Films) | | Rate of Generation of Poor Fusion | | Rate of Generation of Perforations | |
| --- | --- | --- | --- | --- | --- | --- |
| | Welding Starting End | Welding Terminating End | Welding Starting End | Welding Terminating End | Welding Starting End | Welding Terminating End |
| No. 1~10 | 4/10 | 5/10 | 1/10 | 0/10 | 0/10 | 0/10 |
| No. 11~20 | 10/10 | 10/10 | 7/10 | 6/10 | 1/10 | 4/10 |

As can be clearly seen from Table 1, it is found that the rates of generation of poor fusion and perforations of the samples Nos. 1 to 10 obtained by a metal webs splicing method according to the invention are smaller than those of the samples Nos. 11 to 20 obtained by welding the metal webs by use of the electrode that was ground to a sharp-edged body. Also, although the sooting has no influence on the splicing strength of the spliced metal webs unlike the poor fusion and perforations, the sooting has ill effects on the luster of the spliced metal webs. In this respect as well, as shown in Table 1, it is also found that the metal webs splicing method according to the present invention is effective in realizing a lustrous spliced portion.

Also, the appearances of the samples in which the poor fusion or perforations had occurred were observed after they were rolled, but it is found that such poor fusion or perforations have not been improved by the rolling.

In the above-mentioned embodiment, description has been given of the high frequency pulse arc welding. However, the invention is not always limited to this, but similar effects can also be obtained by other kinds of TIG welding.

As has been described hereinbefore, according to the present metal webs splicing method, the arc is generated at a distance from the metal webs to be spliced and the tapering end portion of the electrode is preliminarily welded into a hemispherical shape, so that the arc will never be unstable even if the length of the arc is suddenly changed in the welding starting and terminating ends of the weldedly spliced portion. For this reason, the present metal webs splicing method can prevent occurrences of poor fusion, perforations and sooting.

Figure 4A:
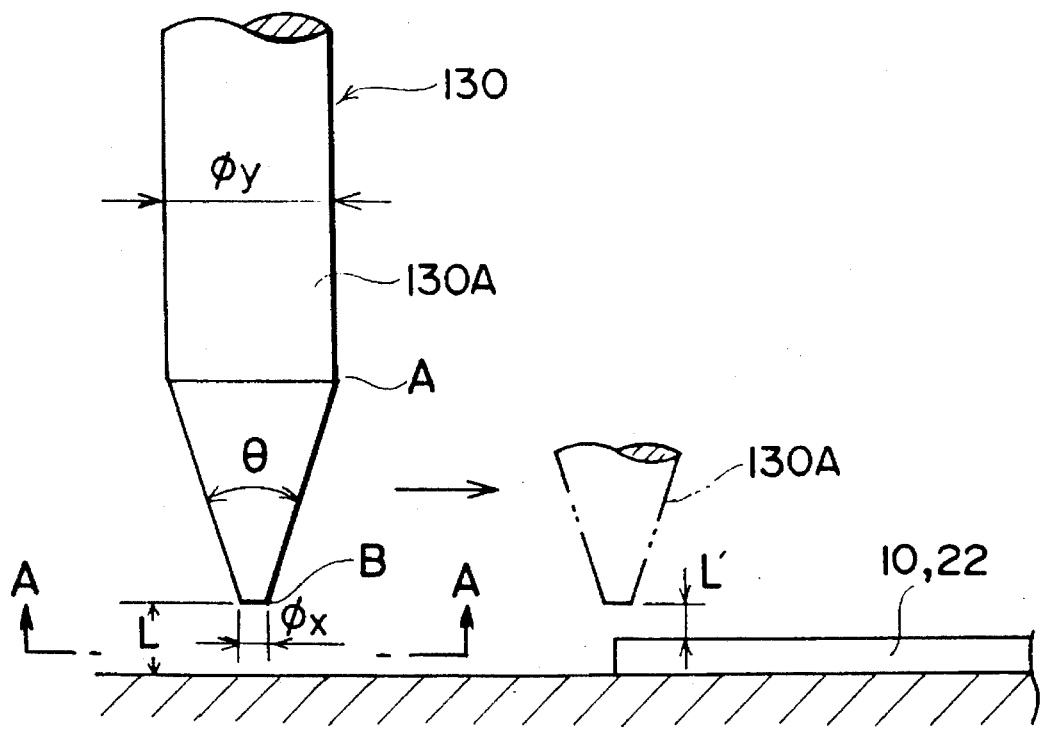
FIG. 4(a) is a side view of an electrode of a welding device provided in a metal webs splicing apparatus according to the invention.
Figure 4B:
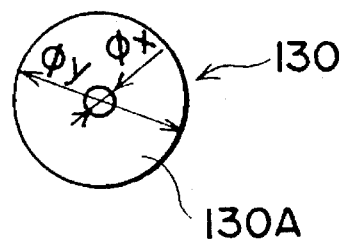
FIG. 4(b) is a view taken along arrows A-A in FIG. 4(a)
Figure 6A:
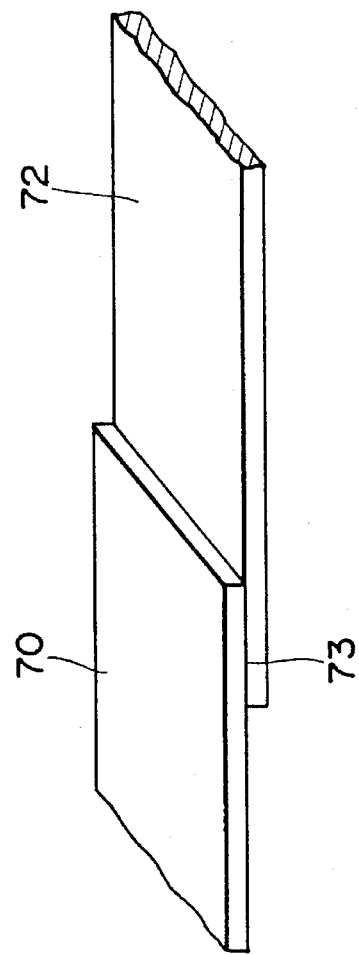
FIGS. 6(a) and (b) are respectively perspective views to show conventional metal webs splicing methods; and, FIG. 7 is a general explanatory view to illustrate a positional relationship between a welding electrode of a conventional welding device and metal webs.
Figure 6B:
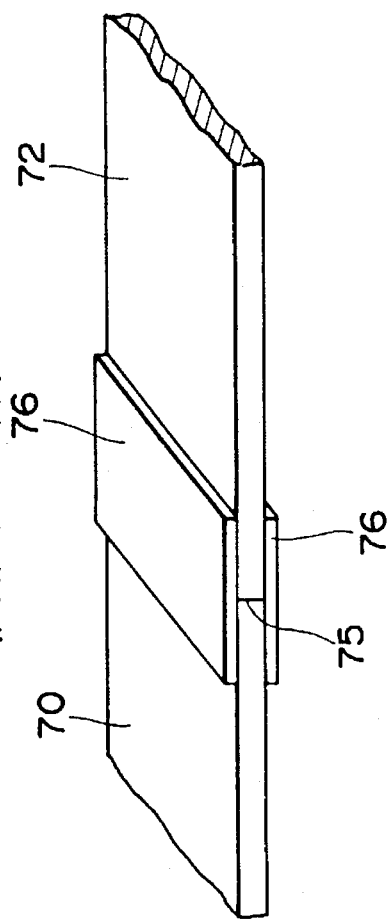

Referring now to FIGS. 4(a) and (b), there is shown a tungsten electrode 130A which is provided in a welding torch 130. As shown in FIG. 4(a), the tungsten electrode 130A is, as a whole, formed in a substantially cylindrical body having a diameter of y. More particularly, the diameter of the tungsten electrode 130A is gradually decreased from y down to x, starting with A point to B point in the lower endface thereof and the lower endface B is formed in a flat surface. φ shown in FIG. 4 designates a leading end angle which may be 60 degrees or less, preferably, in the range of 45–20 degrees.

When splicing the metal webs together by welding, arc is generated with the tungsten electrode 130A spaced apart from the metal webs and, after the generation of the arc, the tungsten electrode 130A is moved above the metal webs to thereby weld and splice the metal webs together. In this case, as shown in FIG. 4(a), if the tungsten electrode reaches above the welding starting ends of the metal webs 10, 22, then the length of the arc is suddenly decreased from L to L'. However, the whole outer periphery of the flat surface B of the tungsten electrode 130A provides an arc generation boundary, with the result that the arc remains stable. For this reason, poor fusion, perforations or the like will never occur in the ends of the metal webs 10, 22 that have been weldedly spliced together. Also, when the tungsten electrode moves apart from the welding terminating ends of the metal webs, the length of the arc is suddenly increased from L' to L. However, likewise in the above-mentioned case, the arc remains stable, eliminating the possibility that poor fusion, perforations or the like may occur.

Referring back to FIG. 1, downstream of the welding device 24 there is disposed a rolling device 32 including reduction roller 34 which is used to roll the weldedly spliced portion of the metal webs ends 10A, 22A. Such rolling treatment presses and constricts a level difference produced in the weldedly spliced portion. This rolling treatment improves the splicing strength of the weldedly spliced portion. The reason for this is that the tensile strength of the spliced metal webs lowered due to welding is recovered by the work hardening of the spliced portion due to the rolling treatment and also that the spliced portion is worked by the rolling treatment into a shape hard to cause stress concentration.

In the above-mentioned embodiment, the metal web 10 is butted against the metal web 22. However, this is not limitative but the metal webs may be slightly lapped on each other. When the metal webs 10 and 22 are slightly lapped on each other and are then spliced together, a rolling treatment is especially required.

Next, description will be given below of the test results obtained when the weldedly spliced portion achieved by use of a splicing apparatus (which uses a tungsten electrode including a flat surface having a diameter of 0.3 mm or more in the leading end thereof) according to the present invention is compared with the weldedly spliced portion achieved by use of an electrode which is formed in a sharp edge shape).

Test sample No. 101 to No. 130 were respectively obtained in such a manner that metal webs of Al alloy each having a thickness of 0.10 mm and width of 915 mm were lapped by 1 mm on each other and then welded and spliced together at a welding speed of 6 m/min., and thereafter the welded portions thereof were rolled under the same condition.

The test samples Nos. 101 to 110 are respectively metal webs spliced by use of a tungsten electrode obtained by grinding the leading end thereof into a shape having leading end angle of 30° and then forming a flat surface having a diameter of 0.6 mm in the lower end portion thereof.

The test samples Nos. 111 to 120 are respectively metal webs spliced by use of an electrode obtained by grinding the leading end thereof into a shape having leading end angle of 30° and then forming a flat surface having diameter of 0.3 mm in the lower end portion thereof.

The test samples Nos. 121 to 130 are respectively metal webs spliced by use of an electrode obtained by grinding the leading end thereof into a shape having a leading end angle of 30 with no further working. That is, this electrode has a sharp-edge-shaped end with no flat surface thereon.

These test samples No. 101 to No. 130 were welded and spliced and the appearances thereof were compared with one another before they were rolled. In particular, they were compared and evaluated with respect to the generation of sooting, poor fusion and perforations in the two regions thereof: one of the regions ranges from the welding starting end to a point 10 mm therefrom; and, the other region ranging from the welding terminating end to a point 10 mm preceding thereto. The comparison was made on the basis of the rate of generation or occurrences of the above-mentioned unfavorable phenomena. The results obtained by such comparison are shown in Table 2. In this table, 2/10 represents that in 2 of 10 samples there were generated sooting, poor fusion, perforations and the like.

TABLE 2

| Sample No. | Rate of Generation of Sooting (Oxidized Films) | | Rate of Generation of Poor Fusion | | Rate of Generation of Perforations | |
|---|---|---|---|---|---|---|
| | Welding Starting End | Welding Terminating End | Welding Starting End | Welding Termina- ting End | Welding Starting End | Welding Termina- ting End |
| No. 101 ~ 110 | 2/10 | 2/10 | 0/10 | 0/10 | 0/10 | 0/10 |
| No. 111 ~ 120 | 5/10 | 6/10 | 0/10 | 0/10 | 0/10 | 0/10 |
| No. 121 ~ 130 | 10/10 | 10/10 | 7/10 | 6/10 | 1/10 | 4/10 |

As can be understood clearly from Table 2, it is found that the rates of generation of poor fusion and perforations in the samples Nos. 101 to 110, and Nos. 111 to 120 welded and spliced by use of a metal webs splicing apparatus according to the invention are smaller than those in the samples Nos. 121 to 130 welded and spliced by use of a sharp edge shaped electrode according to the prior art. Also, although the sooting has smaller effects on the splicing strength than the poor fusion and perforations, in order to eliminates such sooting to thereby be able to provide a lustrous spliced portion, the tungsten electrode including a flat surface in the lower end thereof which has a diameter of 0.6 mm is preferable to the tungsten electrode including a flat surface having a diameter of 0.3 mm.

We observed the appearances of all of samples used in our tests after they were rolled. It has been found from such observation that the samples in which the poor fusion or perforations occurred have not been improved in the poor fusion or perforations thereof even after rolled.

Although in the above-mentioned embodiment description has been given in connection with a high frequency pulse arc welding, this is not limitative, but, according to the invention, other kinds of TIG welding can be employed to provide a similar effect.

As has been described hereinbefore, in a metal webs splicing apparatus according to the invention, due to the fact that a flat surface having a diameter of 0.3 mm or more arc generation is formed in the respective ends of the electrode of a welding torch, the arc is prevented from being unstable even if the length of the arc is suddenly changed at the welding starting or terminating end of the weldedly spliced portion. Therefore, according to the invention, the occurrences of poor fusion, perforations and sooting can be prevented.

Figure 7:
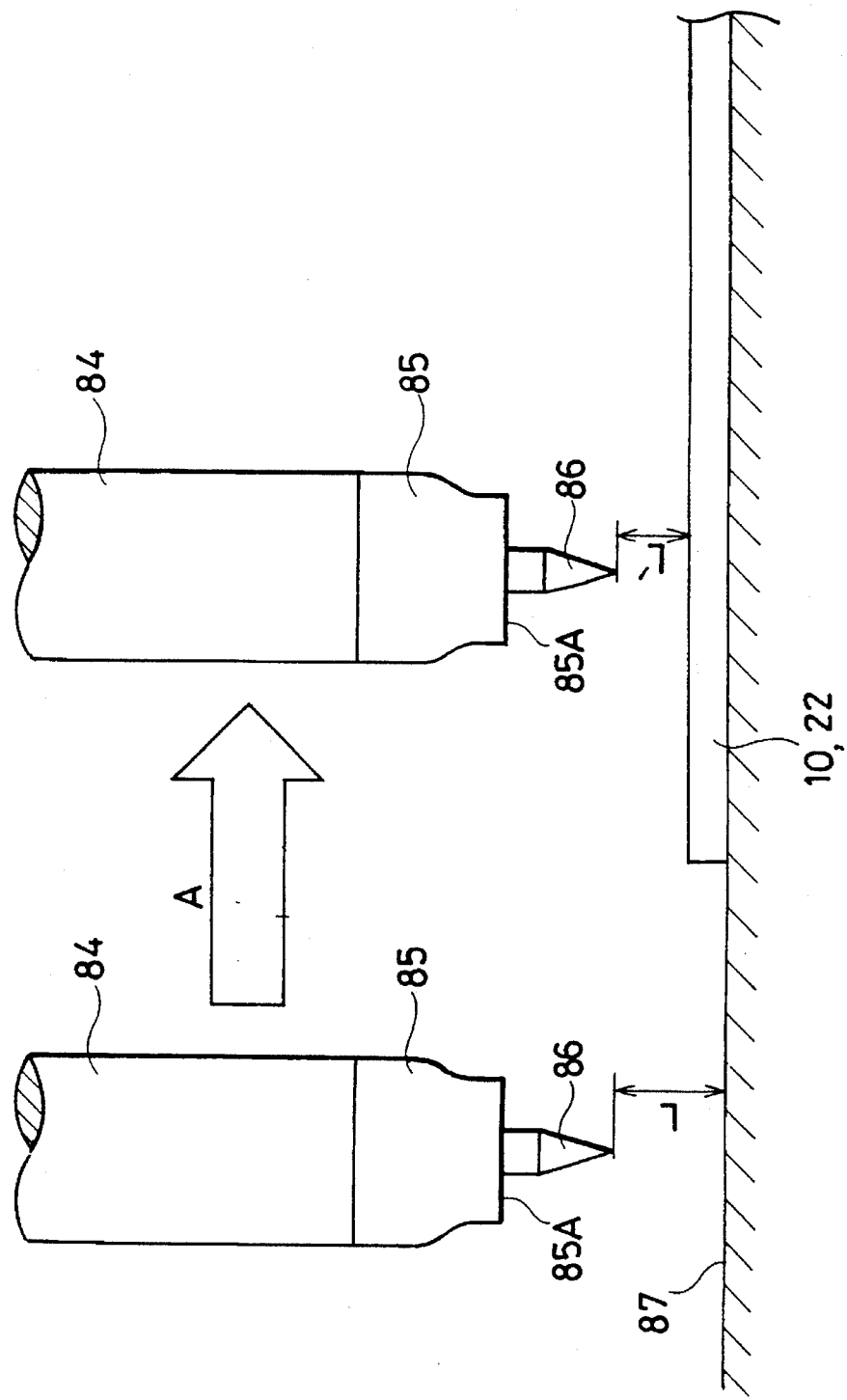

Referring now to FIG. 5, there is shown a flow sheet of the operation of a welding torch 84 shown in FIG. 7 and employed in a metal web splicing apparatus according to the invention.

Description will be given below of the metal web splicing apparatus according to the invention in connection with FIG. 5. At first, when a signal for welding starting is set to its ON state, as shown in FIG. 5(a), then an arc generation circuit is turned on and a voltage is applied to the arc generation circuit as shown in FIG. 5(c) to thereby generate arc as shown in FIG. 5(d). Simultaneously with the generation of the arc, as shown in FIG. 5(e), a torch holding timer is put into operation to thereby hold a welding torch 84 at a given position spaced apart from the spliced portion of the metal webs 10, 22 for a period of t2 seconds. After the lapse of t2 seconds, the torch holding timer is released to thereby move the welding torch 84 of FIG. 7 as shown in FIG. 5(f), so that the leading end of the metal web 10 and the leading end of the metal web 22 are welded and spliced together. The arc current of the welding torch 84, as shown in FIG. 5(g), rises up to a value of [2], which is higher than a set value [1], for a period of approximately t1 seconds since the arc generation circuit turns on, and thereafter the current remains stable at the set value [1]. In other words, since the welding torch 84 is held at a position spaced apart from the spliced portion for a period of t2 seconds and the welding torch 84 of FIG. 7 is then moved so as to weld and splice together the two metal webs, the welding and splicing can be achieved after the arc is stabilized to the set value [1], whereby the melting-away, poor fusion, unfusion, perforation, poor appearance and the like can be prevented in the spliced portion. After completion of the welding and splicing operation, as shown in FIG. 5(b), a signal indicating the end of the welding is set to its ON state to thereby stop the generation of the arc.

Here, it is preferred that t1 may be 0.2~1.0 seconds and t2 may be 0.6 seconds or more.

Now, the ends of the metal webs 10, 22 welded and spliced together in the above-mentioned manner are then rolled by the reduction roller 34 of the rolling device 32 shown in FIG. 1. A level difference produced in the weldedly spliced portion of the metal webs is pressed and constricted by the rolling treatment. This rolling treatment improves the splicing strength. The reason for this is that the tensile strength lowered by the welding can be recovered by the rolling treatment due to the work hardening of the spliced portion and also that the spliced portion is worked by the rolling treatment into a shape which is hard to cause stress concentration.

Although in the above-mentioned embodiment the metal web 10 is butted against the metal web 22, the invention is not limited to this, but the metal webs may be slightly lapped on each other before they are welded and spliced together. However, when the metal webs 10 and 22 are slightly lapped on each other and are then spliced together by welding, a rolling treatment is especially required.

Next, description will be given below of a test in which the weldedly spliced portion achieved by a metal webs splicing method according to the invention (in which the weldedly splicing is started after the lapse of 0.6 seconds or more since the arc generation) is compared with weldedly spliced portion achieved by another method in which the weldedly splicing is started 0.5 sec. or more before the arc generation.

Test samples No. 201~No. 205 and test samples No. 211 ~No. 240 are respectively obtained in such a manner that metal webs of Al alloy each having a thickness of 0.10 mm and a width of 915 mm are lapped 1 mm on each other and are then welded together.

Test samples No. 206~No. 210 are respectively obtained in such a manner that metal webs of Al alloy each having a thickness of 0.50 mm and a width of 1470 mm are lapped 1 mm on each other and are then welded together.

Test samples No. 241~No. 243 are respectively obtained in such a manner that a metal web of Al alloy having a thickness of 0.24 mm and a width of 840 mm is lapped 1 mm on a metal web of Al alloy having a thickness of 0.10 mm and a width of 840 mm and are then welded together, and further the weldedly spliced portion thereof is rolled such that the web thicknesses difference between a heat affected zone produced in the metal web having a thickness of 0.10 mm and its adjoining fused portion Al mother material provides 30% or more.

Also, the test samples No. 201~No. 243 were welded at a speed of 6 m/min.. The welding currents for the samples No. 201~No. 205 and samples No. 211~No. 240 were 16A respectively, the welding currents for the samples No. 206 ~No. 210 were 105A, and the welding currents for the samples No. 241~No. 243 were 26A. However, for all of the samples, the currents at the time of generation of the arc were 30A, respectively.

The test samples No. 241~No. 243 were rolled under the same conditions.

In the comparison test 3, times from the arc generation to the welding starting in the samples No. 201 to No. 205 were set to 1 sec., 0.7 sec., 0.6 sec., 0.5 sec., and 0 sec., respectively, while times from the arc generation to the welding starting in the samples No. 206 to No. 210 were set to 1 sec., 0.6 sec., 0.5 sec., 0.4 sec., and 0 sec., respectively. That is, the welding starting ends of these samples were compared with one another with respect to the breakage due to welding and poor fusion. The comparison test results are shown in Table 3.

TABLE 3

| Sample No. | Web Thickness | Time (Seconds) from Arc Generation to Welding Start | Evaluation | Special Remarks |
| --- | --- | --- | --- | --- |
| 201 | 0.1 mm and 0.1 mm | 1.0 | ○ (excellent) | Welding Break Length of 1 mm or less |
| 202 | 0.1 mm and 0.1 mm | 0.7 | ○ (excellent) | Welding Break Length of 1 mm or less |
| 203 | 0.1 mm and 0.1 mm | 0.6 | Δ (middle) | Welding Break Length of 4 mm |
| 204 | 0.1 mm and 0.1 mm | 0.5 | X (bad) | Welding Break Length of 10 mm or more |
| 205 | 0.1 mm and 0.1 mm | 0 | X (bad) | Welding Break Length of 10 mm or more |
| 206 | 0.5 mm and 0.5 mm | 1.0 | ○ (excellent) | No Poor Fusion is Generated |
| 207 | 0.5 mm and 0.5 mm | 0.6 | ○ (excellent) | No Poor Fusion is Generated |
| 208 | 0.5 mm and 0.5 mm | 0.5 | ○ (excellent) | No Poor Fusion is Generated |
| 209 | 0.5 mm and 0.5 mm | 0.4 | X (bad) | Poor Fusion is Found |
| 210 | 0.5 mm and 0.5 mm | 0 | X (bad) | Poor Fusion is Found |

In a comparison test 4, times from the generation of the arc to the welding starting in the test samples No. 211 to No. 220, No. 221 to No. 230, and No. 231 to No. 240 were set to 1.0 sec., 0.6 sec., and 0.5 sec., respectively and the rates of generation of poor appearance (lack of luster due to generation of sooting) were compared. The comparison results are shown in Table 4. In this table, 2/10 represents that in 2 of 10 samples there were generated sooting.

TABLE 7

| Sample No. | Time (Seconds) From Arc Generation to Welding Start | Web Thickness | Rate of Generation of Sooting (Oxidized Films) |
| --- | --- | --- | --- |
| 211 ~ 220 | 1.0 | 0.1 mm and 0.1 mm | 0/10 |
| 221 ~ 230 | 0.6 | 0.1 mm and 0.1 mm | 2/10 |
| 231 ~ 240 | 0.5 | 0.1 mm and 0.1 mm | 5/10 |

In a comparison test 5, the test samples No. 241 to No. 243 were used. In particular, with a tension force of 235 kg being applied on the samples, the samples were respectively turned round two rubber rollers (each having a diameter of 600 mm), 22 rubber rollers (each having a diameter of 200 mm), and another two rubber rollers (each having a diameter of 180 mm), and the number of rounds in which they were cracked was examined.

The results obtained by the pass roller passage test are shown in Table 5.

TABLE 5

| Sample No. | Time (Seconds) From Arc Generation to Welding Start | Welding Break Length (mm) | Spliced Web Thickness | Number of Rounds of Crackling Generation |
| --- | --- | --- | --- | --- |
| 241 | 1.0 | 1.0 | 0.24 mm and 0.1 mm | 62 Rounds |
| 242 | 0.5 | 4.0 | 0.24 mm and 0.1 mm | 42 Rounds |
| 243 | 0.4 | 15 | 0.24 mm and 0.1 mm | 19 Rounds |

As can be clearly understood from Table 3, it is found that no unfavorable phenomena exceeding the allowable range occur in the samples Nos. 201, 202, 203, 206 and 207 that were welded and spliced by a metal webs splicing method according to the present invention.

Also, as can be clearly seen from Table 4, it is found that if the time from the arc generation to the welding starting is extended, then the rate of generation of sooting can be decreased even in the thin metal webs spliced having thicknesses of 0.1 mm and 0.1 mm in which sooting is likely to occur.

Further, as can be clearly understood from Table 5, in the sample requiring 1 second from the arc generation to the welding starting, the welding break length is on the order of 1 mm which is smaller than those in the other samples, and at the same time the handling strength thereof is larger than those of the other samples, that is, it is harder to crack than the others.

Although in the above-mentioned embodiment the description has been given of the high frequency pulse arc welding, the invention is not limited to this, but a similar effect can be provided by use of other TIG welding methods.

Also, in the above-mentioned embodiment the description has been given by way of the welding torch 84 in FIG. 7. However, this is not always limitative, but, according to the invention, the welding torch 30 in FIG. 3, the welding torch 130 in FIG. 4 and the like can also be used.

As has been described hereinbefore, in a metal webs splicing method according to the present invention, the arc is generated at a distance from the metal webs to be spliced and, after the lapse of 0.6 sec. or more since the generation of the arc, the ends of the metal webs are welded and spliced together, so that the weldedly splicing can be achieved when the arc current is stabilized to a set value.

Therefore, the present invention can prevent occurrences of welding break, poor fusion, un-welding, perforations, poor appearance in the weldedly spliced portion of the metal webs. Also, the invention can improve the strength of the weldedly spliced portion and further it can prevent rollers from being dirty or damaged in a surface treatment step or in a coating step following the welding and splicing step.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of splicing metal webs, wherein ends of a leading metal web and a following metal web are weldedly spliced together at a splicing portion comprising the steps of:

arc-weldedly splicing said metal webs by use of a nonconsumable welding electrode, a discharge forming portion of said electrode being of a conical tapered shape and having a flat portion formed at a forward end thereof, with said electrode and said metal webs being in a non-contact condition with respect to each other during arc initiation;

raising the arc current of said electrode soon after the arc initiation to a value higher than a welding current value which is set in accordance with the thickness of said metal webs, and thereafter lowering the arc current to the welding current value; and thereafter rolling the spliced portion.

2. The method of splicing metal webs as set forth in claim 1, wherein the diameter of said flat portion of said welding electrode is 0.6 mm or greater.

3. The method of splicing metal webs as set forth in claim 1, wherein said metal webs are aluminum plates.

4. A metal web splicing apparatus wherein ends of a leading metal web and a following metal web are weldedly spliced together at a splicing portion comprising:

a nonconsumable welding electrode having a discharge forming portion which is of a conical tapered shape and a flat portion formed at the forward end thereof, said electrode and said metal webs being in a non-contact condition with respect to each other during arc initiation;

an arc current controller that raises the arc current of said electrode soon after the arc initiation to a value higher than a welding current value which is set in accordance with the thickness of said metal webs, and thereafter lowers the arc current to the welding current value; and a rolling device for rolling said splicing portion.

5. The metal webs splicing apparatus as set forth in claim 1, wherein the diameter of said flat portion of said welding electrode is 0.6 mm or greater.

\* \* \* \* \*